(12) United States Patent
Johnston et al.

(10) Patent No.: US 11,251,953 B2
(45) Date of Patent: Feb. 15, 2022

(54) PROVING PRIME INTEGERS FOR ENCRYPTION

(71) Applicant: Juniper Networks, Inc., Sunnyvale, CA (US)

(72) Inventors: Anna M. Johnston, Vancouver, WA (US); Rathna Ramesh, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/947,020

(22) Filed: Jul. 15, 2020

(65) Prior Publication Data

US 2022/0021533 A1 Jan. 20, 2022

(51) Int. Cl.
*H04L 29/06* (2006.01)
*H04L 9/30* (2006.01)

(52) U.S. Cl.
CPC ................... *H04L 9/3033* (2013.01)

(58) Field of Classification Search
CPC . H04L 9/3033; H04L 9/00; H04L 9/08; H04L 9/0662; G06F 21/72
See application file for complete search history.

(56) References Cited

U.S. PATENT DOCUMENTS

| | | | |
|---|---|---|---|
| 6,345,098 B1 | 2/2002 | Matyas, Jr. et al. | |
| 7,016,494 B2* | 3/2006 | Hopkins | H04L 9/3033 380/44 |
| 8,509,429 B2* | 8/2013 | Cuypers | H04L 9/003 380/44 |
| 9,577,826 B2* | 2/2017 | Feix | G06F 17/11 |
| 9,596,080 B2* | 3/2017 | Feix | G06F 7/58 |
| 10,114,850 B1* | 10/2018 | Dangi | G06F 3/0641 |
| 10,860,538 B2* | 12/2020 | Dangi | G06F 16/1748 |
| 2013/0051552 A1 | 2/2013 | Handschuh et al. | |

FOREIGN PATENT DOCUMENTS

GB 2574613 A 12/2019

OTHER PUBLICATIONS

Extended European Search Report for Application No. EP20194426. 1, dated Feb. 18, 2021, 9 pages.

(Continued)

*Primary Examiner* — Hosuk Song
(74) *Attorney, Agent, or Firm* — Harrity & Harrity, LLP

(57) ABSTRACT

A device may receive a set of cryptographic parameters associated with an integer, wherein the set of cryptographic parameters includes a linked list of potential prime integers, in an order, used to generate the integer. The device may determine, iteratively and in the order, whether each potential prime integer included in the linked list of potential prime integers is a prime integer using a primality test or a lookup operation based on a set of proven prime integers. The device may determine whether the integer is a proven prime integer based on determining whether each potential prime integer included in the linked list of potential prime integers is a prime integer. The device may authorize, when the integer is a proven prime integer, the integer for use in a cryptographic protocol.

20 Claims, 13 Drawing Sheets

100 ➘

Device

105
Receive an integer to be used in a cryptographic protocol and prime information associated with the integer ➔

Device

(56) References Cited

OTHER PUBLICATIONS

Agrawal et al., Primes in p, Tech, report, Indian Institute of Technology Kanpur, Updated document on web: http://www.cse.iitk.ac.in/users/manindra/primality_v6.pdf, 2002, pp. 1-9.

Brillhart et al., New primality criteria and factorizations of 2m − 1, Mathematics of Computation, 29, No. 130, 1975, pp. 620-647.

Crandall et al., Prime numbers: A computational perspective, second ed., ch. 4.1, Springer-Verlag, 175 Fifth Avenue, New York, New York 10010, U.S.A., 2005, pp. 173-176.

Ueli M. Maurer, Fast generation of prime numbers and secure public?? key cryptographic parameters, Journal of Cryptology 8, 1995, 37 Pages.

Miller et al., Rsa public-key data encryption system having large random prime number generating microprocessor or the like, US Patent assigned to Racal-Milgo Inc; Expired 2000; Dec. 15, 1980, 24 Pages.

Henry C. Pocklington, The determination of the prime or composite nature of large numbers by fermat's theorem, Proceedings of the Cambridge Philosophical Society, No. 18, University of Cambridge, 1914-1916, 268 Pages.

Pohlig et al., An improved algorithm for computing logarithms over gf(p) and its cryptographic significance, Transactions on Information Theory, No. 24, IEEE, Jan. 1978, pp. 106-110.

J.M. Pollard, Monte carlo methods for index computation (mod p), Mathematics of Computation, No. 32, Jul. 1978, pp. 918-924.

M.O. Rabin, Probabilistic algorithms for testing primality, Journal of Number Theory, 12, 1980, pp. 128-138.

J. Shawe-Taylor, Proportion of primes generated by strong prime methods, Electronics Letters, 22, Jan. 16, 1992, pp. 135-137.

Massimo et al., Safety in numbers: On the need for robust diffie-hellman parameter validation, Public-Key Cryptography (PKC 2019) 11443, 2019, 36 Pages.

Co-pending U.S. Appl. No. 16/852,172, entitled "Prime Number Generation for Encryption," by Ramesh et al., filed Apr. 17, 2020, 54 Pages.

Co-pending U.S. Appl. No. 16/836,635, entitled "Mult-Key Exchange," by Anna M. Johnston, filed Mar. 31, 2020, 41 Pages.

\* cited by examiner

US 11,251,953 B2

PROVING PRIME INTEGERS FOR ENCRYPTION

BACKGROUND

Public-key algorithms may be based on computational difficulty of various problems, such as integer factorization of two-prime composite integers and the difficulty of calculating discrete logarithms. Many cryptographic systems may be built around prime integers, such as the prime integers used in factoring based, finite field, or elliptic curve cryptography.

SUMMARY

According to some implementations, a method may include receiving, by a device, prime information associated with an integer to be used in a cryptographic protocol; processing the prime information to identify a list of potential prime integers, wherein a potential prime integer included in the list of potential prime integers indicates a generator associated with the potential prime integer and a quantity of primes used to generate the potential prime integer; determining whether the potential prime integers included in the list of potential prime integers are prime using a primality test or a lookup operation based on a set of proven prime integers and a quantity of primes used to generate the potential prime integers included in the list of potential prime integers; determining a prime validation status of the integer for the cryptographic protocol based on determining whether each potential prime integer included in the list of potential prime integers is prime using the primality test or the lookup operation; and using, by the device and when the prime validation status of the integer indicates that the integer is a validated prime integer, the integer in the cryptographic protocol.

According to some implementations, a device may include one or more memories and one or more processors to: receive a set of cryptographic parameters associated with an integer, wherein the set of cryptographic parameters includes a linked list of potential prime integers, in an order, used to generate the integer; determine, iteratively and in the order, whether each potential prime integer included in the linked list of potential prime integers is a prime integer using a primality test or a lookup operation based on a set of proven prime integers; determine whether the integer is a proven prime integer based on determining whether each potential prime integer included in the linked list of potential prime integers is a prime integer; and authorize, when the integer is a proven prime integer, the integer for use in a cryptographic protocol.

According to some implementations, a non-transitory computer-readable medium may store one or more instructions. The one or more instructions, when executed by one or more processors of a device, may cause the one or more processors to: receive a set of cryptographic parameters associated with an integer, wherein the set of cryptographic parameters include a linked list of potential prime integers used to generate the integer in an order; determine, iteratively and in the order, whether each potential prime integer included in the linked list of potential prime integers is a prime integer using a primality test or a lookup operation based on a set of proven prime integers; determine whether the integer is a proven prime integer based on determining that each potential prime integer included in the linked list of potential prime integers is a prime integer; and use, when the integer is a proven prime integer, the integer in a cryptographic protocol.

DETAILED DESCRIPTION

Figure 1A:
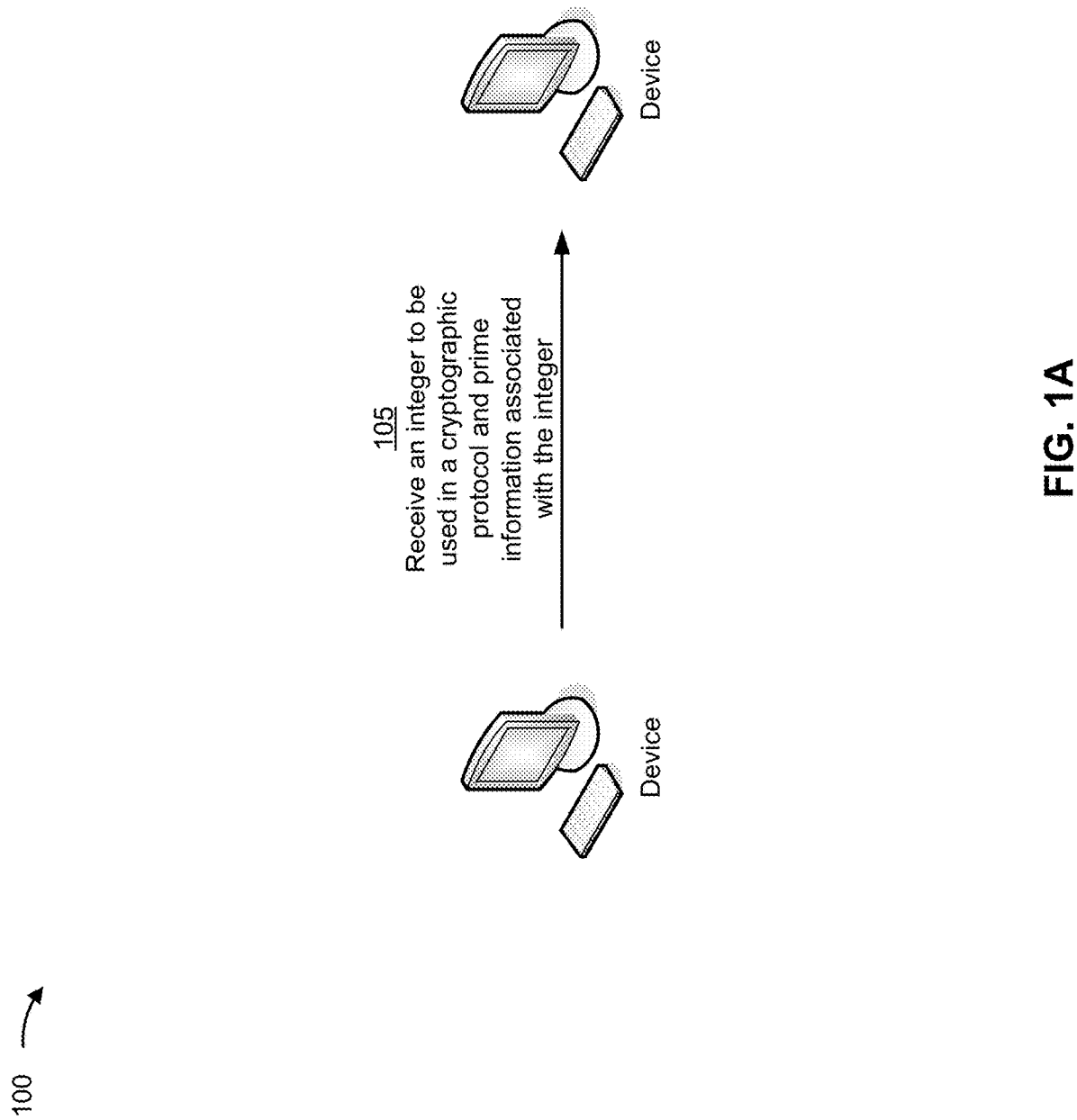
FIGS. 1A-1F are diagrams of an example implementation described herein.

The following detailed description of example implementations refers to the accompanying drawings. The same reference numbers in different drawings may identify the same or similar elements.

Cryptographic systems may be built around prime integers. Some cryptographic systems (e.g., discrete logarithm based public key cryptographic systems) use a fixed prime integer as an element to provide security for the systems. However, a malefactor may attempt to break into the system by attacking the fixed prime integer. Fixed prime integers imply a very high value to cost ratio for these attacks, greatly increasing the motivation of attackers and risk to users. Furthermore, improvements in computing power over time may reduce the amount of time that may be required to successfully mount this attack. Once a successful attack occurs, discrete logarithms modulo the fixed prime integer become relatively easy to compute and the cryptographic system may be compromised.

To avoid the security risks associated with using a fixed prime integer, a device may be configured to replace a prime integer with a new prime integer. However, the device must verify that the new prime integer is a prime integer suitable for the cryptographic system. For example, when a device must verify a new prime integer P for use in a finite field based asymmetric cryptographic system, the device must verify: that the new prime integer P is actually a prime integer; that the new prime integer P has a cryptographically suitable sized subgroup, of order r; that r is a prime integer; and that a generator integer g used to generate the new prime integer P has order r. Accordingly, the device may expend considerable computing resources (e.g., processing resources, memory resources, power resources, and/or the like) when using a typical computationally-intensive prime verification process.

Some implementations described herein provide a device that may receive a set of cryptographic parameters associated with a new prime integer P, wherein the set of cryptographic parameters includes a linked list of potential prime integers, in an order, used to generate the new prime integer P. The device may determine, iteratively and in the order, whether each potential prime integer included in the linked list of potential prime integers is a prime integer using a primality test (e.g., Pocklington's primality test) or a lookup operation based on a set of proven prime integers. The device may determine whether the new prime integer P is a proven prime integer based on determining whether each potential prime integer included in the linked list of potential prime integers is a prime integer. Accordingly, when the new prime integer P is a proven prime integer, the device may authorize the integer for use in a cryptographic protocol.

In this way (e.g., by using an algorithm that utilizes Pocklington's primality test), the device may efficiently determine whether the new prime integer P is a proven prime integer. Accordingly, the device may conserve computing resources (e.g., processing resources, memory resources, power resources, and/or the like) that may otherwise be used to perform a typical computationally-intensive prime verification to determine whether the new prime integer P is a prime integer. Moreover, this may allow the device to more frequently update the prime integer to be used in the cryptographic protocol, which may increase security of the device. This may also reduce a likelihood that the prime integer will be successfully attacked and exploited, which may reduce an amount of computing resources that would otherwise be used to identify and/or defend an attack and/or address any damage that might result from a successful attack.

FIGS. 1A-1F are diagrams of one or more example implementations 100 described herein. As shown in FIGS. 1A-1F, the example implementation(s) 100 may include a device that determines whether an integer is a prime integer as part of a proofing process to determine whether the integer may be used in association with a cryptographic protocol, such as a discrete logarithm-based public key cryptographic protocol.

As shown in FIG. 1A, and by reference number 105, a device may receive (e.g., from another device) the integer to be used in the cryptographic protocol and prime information associated with the integer. The prime information may include a list of potential prime integers used to generate the integer. For example, the prime information may include a linked list (or another type of data structure) of potential prime integers that were used to generate the integer (e.g., using a provable prime generation technique, such as a prime generation technique based on Pocklington's theorem).

Figure 1B:
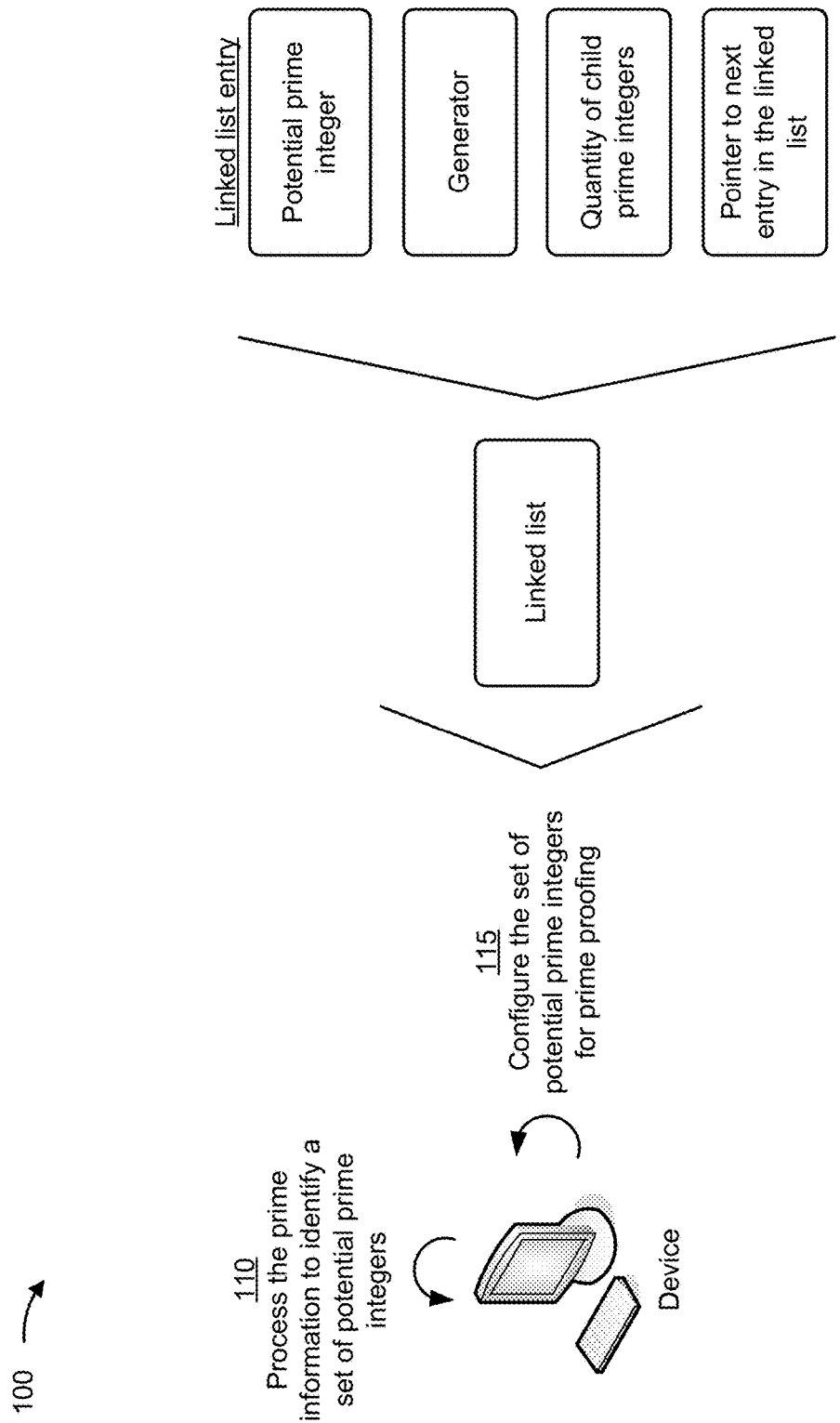

As shown in FIG. 1B, and by reference number 110, the device may process the prime information to identify a set of potential prime integers. For example, the device may process the prime information to identify the linked list of potential prime integers. As shown in FIG. 1B, each entry of the linked list may include a potential prime integer, a generator associated with the potential prime integer, a quantity of potential prime integers used to generate the potential prime integer (also referred to as child prime integers of the potential prime integer), a pointer to the next entry in the linked list, and/or the like.

The linked list may be ordered, such that each potential prime integer used to generate a particular potential prime integer in the linked list is listed before the particular potential prime integer in the linked list. In some implementations, the linked list may be a representation of a prime proof tree (e.g., as further described herein in relation to FIG. 2) for the integer, where each entry in the linked list is associated with a node of the prime proof tree. Accordingly, the linked list may be ordered to represent the structure of the prime proof tree (e.g., entries associated with child nodes of a particular node are ordered before an entry associated with the particular node in the linked list). In such a linked list, the last entry of the linked list may be associated with the integer that is to be used in the cryptographic protocol (e.g., the last entry may include the integer).

As further shown in FIG. 1B, and by reference number 115, the device may configure the set of potential prime integers for prime proofing. For example, the device may identify a first entry of the linked list of the potential prime integers so that the device may iteratively traverse the linked list (e.g., in order), beginning with the first entry of the linked list, to determine whether one or more potential prime integers of the linked list are prime integers, as described herein. In some implementations, the device may determine whether the one or more potential prime integers of the linked list are prime integers as part of the proofing process to determine whether the integer to be used in the cryptographic protocol is a prime integer.

In some implementations, the device may determine whether a potential prime integer associated with an entry of the linked list (e.g., starting with the first entry of the linked list) is a prime integer using a lookup operation or a primality test. One or more processing steps for determining whether a potential prime integer is a prime integer using a lookup operation is described herein in relation to FIG. 1C. One or more processing steps for determining whether a potential prime integer is a prime integer using a primality test is described herein in relation to FIG. 1D.

Figure 1C:
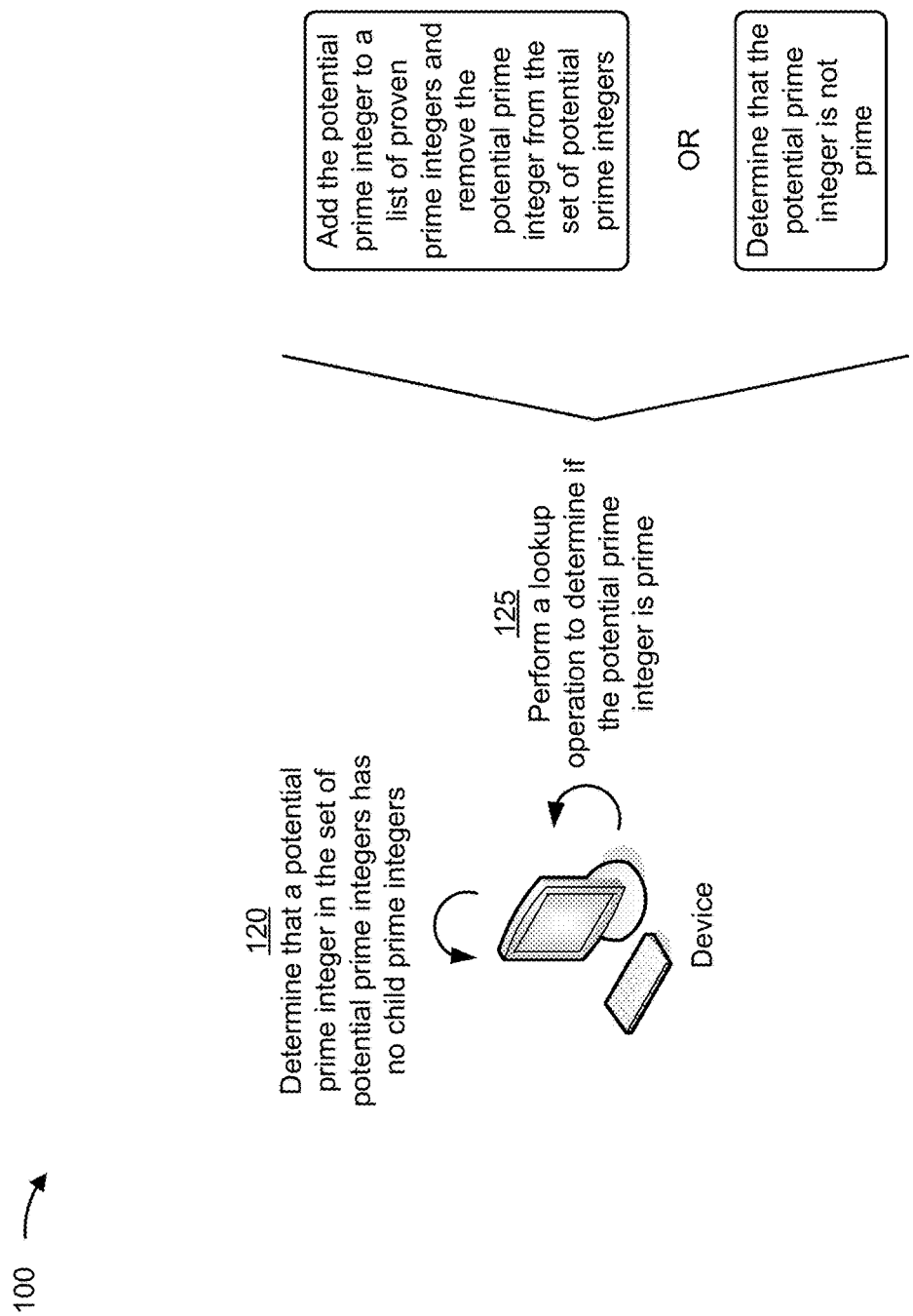

As shown in FIG. 1C, and by reference number 120, the device may determine that a potential prime integer in the set of potential prime integers has no child prime integers. For example, the quantity of child prime integers included in the entry of the linked list associated with the potential prime integer may be zero and the device may therefore determine that the potential prime integer has no child prime integers. Accordingly, as further shown in FIG. 1C and by reference number 125, the device may perform a lookup operation to determine if the potential prime integer is a prime integer.

In some implementations, the device may perform a lookup operation in a set of known prime integers (e.g., that is included in a data structure that is stored by and/or accessible to the device) to determine whether the potential prime integer is included in the set of known prime integers. The device may determine that the potential prime integer is prime when the potential prime integer is included in the set of known prime integers. The device may therefore add the potential prime integer to a set of proven prime integers (e.g., a data structure stored by and/or accessible to the device) that includes one or more potential prime integers of the set of potential prime integers that the device has proven to be prime integers and may remove the prime integer from the set of potential prime integers. For example, the device may add the potential prime integer to a stack of proven prime integers and remove the entry associated with the potential prime integer from the linked list. The device may then process a potential prime integer associated with a next entry in linked list (e.g., as described herein in relation to FIGS. 1C and 1D).

Alternatively, the device may determine that the potential prime integer is not a prime integer, or has not been proven to be a prime integer, when the potential prime integer is not included in the set of known prime integers. Accordingly, the device may cease performing any additional processing steps related to the set of potential prime integers and/or the integer to be used in the cryptographic protocol. Additionally, or alternatively, the device may determine a validation status of the integer to be used in the cryptographic protocol. For example, the device may determine that the validation status is not validated based on determining that the potential prime integer is not a prime integer. As another example, the device may determine that the validation status is failed based on determining that the potential prime integer has not been proven to be a prime integer (e.g., and that therefore the device is unable to determine whether the potential prime integer is a prime integer).

Figure 1D:
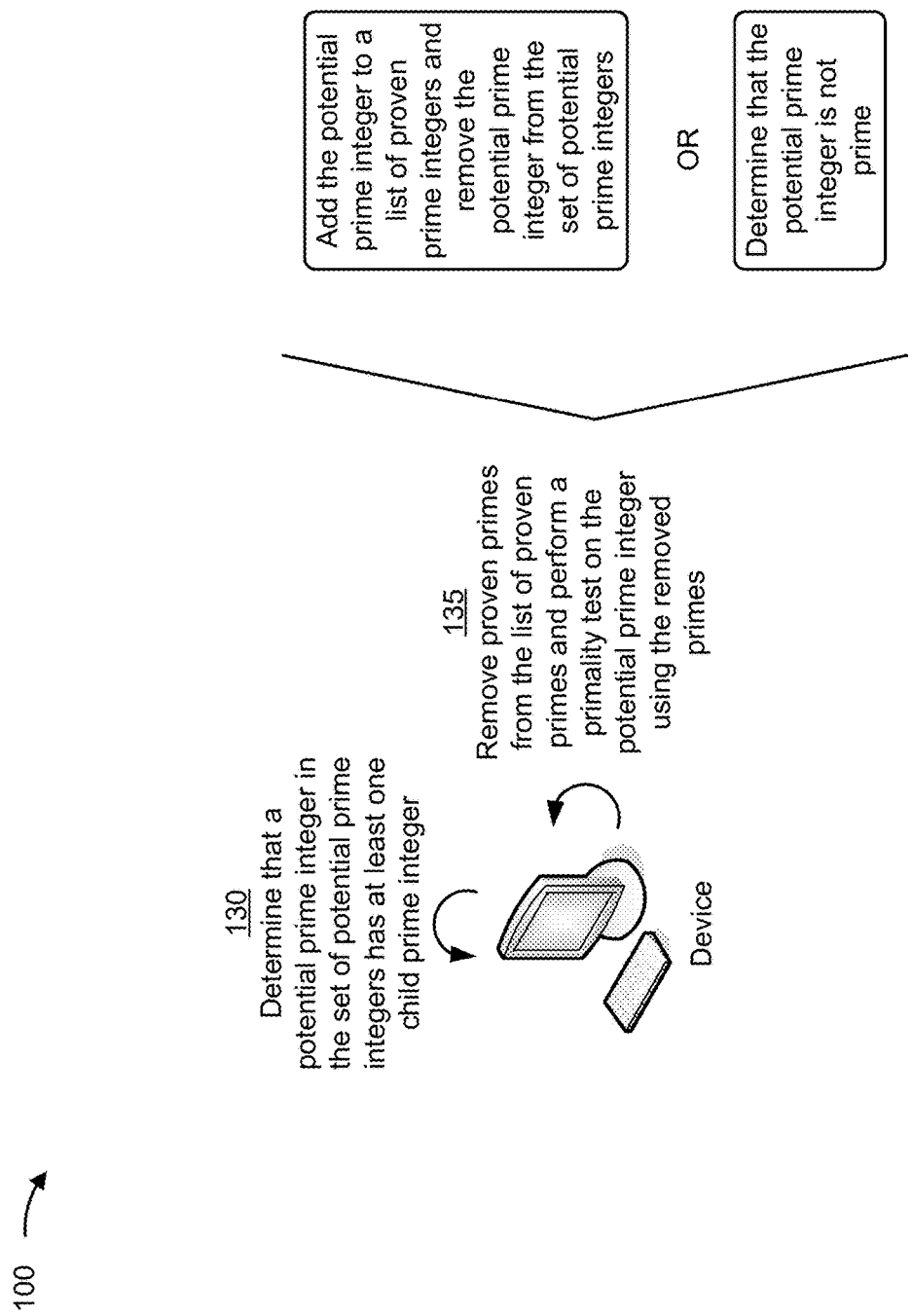

As shown in FIG. 1D, and by reference number 130, the device may determine that a potential prime integer in the set of potential prime integers has at least one child prime integer. For example, the quantity of child prime integers included in the entry of the linked list associated with the potential prime integer may be greater than zero and the device may therefore determine that the potential prime integer has at least one child prime integer.

Accordingly, as further shown in FIG. 1D and by reference number 135, the device may remove one or more prime integers from the set of proven prime integers (e.g., where the one or more prime integers are the most recently added prime integers to the set of proven prime integers) and perform a primality test on the potential prime integer using the one or more prime integers removed from the set of proven prime integers. In some implementations, the quantity of the one or more prime integers removed from the set of proven prime integers is the same as the quantity of child prime integers included in the entry of the linked list. In some implementations, the one or more prime integers removed from the set of proven prime integers may be the child prime integers of the potential prime integer (e.g., that were used to generate the potential prime integer).

In some implementations, the device may determine whether the potential prime integer satisfies the primality test using the one or more prime integers. In some implementations, the device may determine whether the potential prime integer satisfies Pocklington's primality test using the one or more prime integers. For example, to determine that the potential prime integer satisfies the primality test, the device may determine that the potential prime integer is a prime integer, that a subgroup size of a subgroup associated with the potential prime integer satisfies (e.g., is greater than or equal to) a threshold, that an order of the subgroup associated with the integer is prime, and/or that the generator associated with the integer has a same order as the subgroup associated with the integer.

The device may determine that the potential prime integer is prime when the prime integer satisfies the primality test and therefore may add the potential prime integer to the set of proven prime integers and remove the prime integer from the set of potential prime integers. For example, the device may add the potential prime integer to the stack of proven prime integers and remove the entry associated with the potential prime integer from the linked list. The device may then process a potential prime integer associated with a next entry in linked list (e.g., as described herein in relation to FIGS. 1C and 1D).

Alternatively, the device may determine that the potential prime integer is not prime when the prime integer does not satisfy the primality test. Accordingly, the device may cease performing any additional processing steps related to the set of potential prime integers and/or the integer to be used in the cryptographic protocol. Additionally, or alternatively, the device may determine a validation status of the integer to be used in the cryptographic protocol. For example, the device may determine that the validation status is not validated based on determining that the potential prime integer is not a prime integer. As another example, the device may determine that the validation status is failed based on determining that the potential prime integer has not been proven to be a prime integer (e.g., and that therefore the device is unable to determine whether the potential prime integer is a prime integer).

Figure 1E:
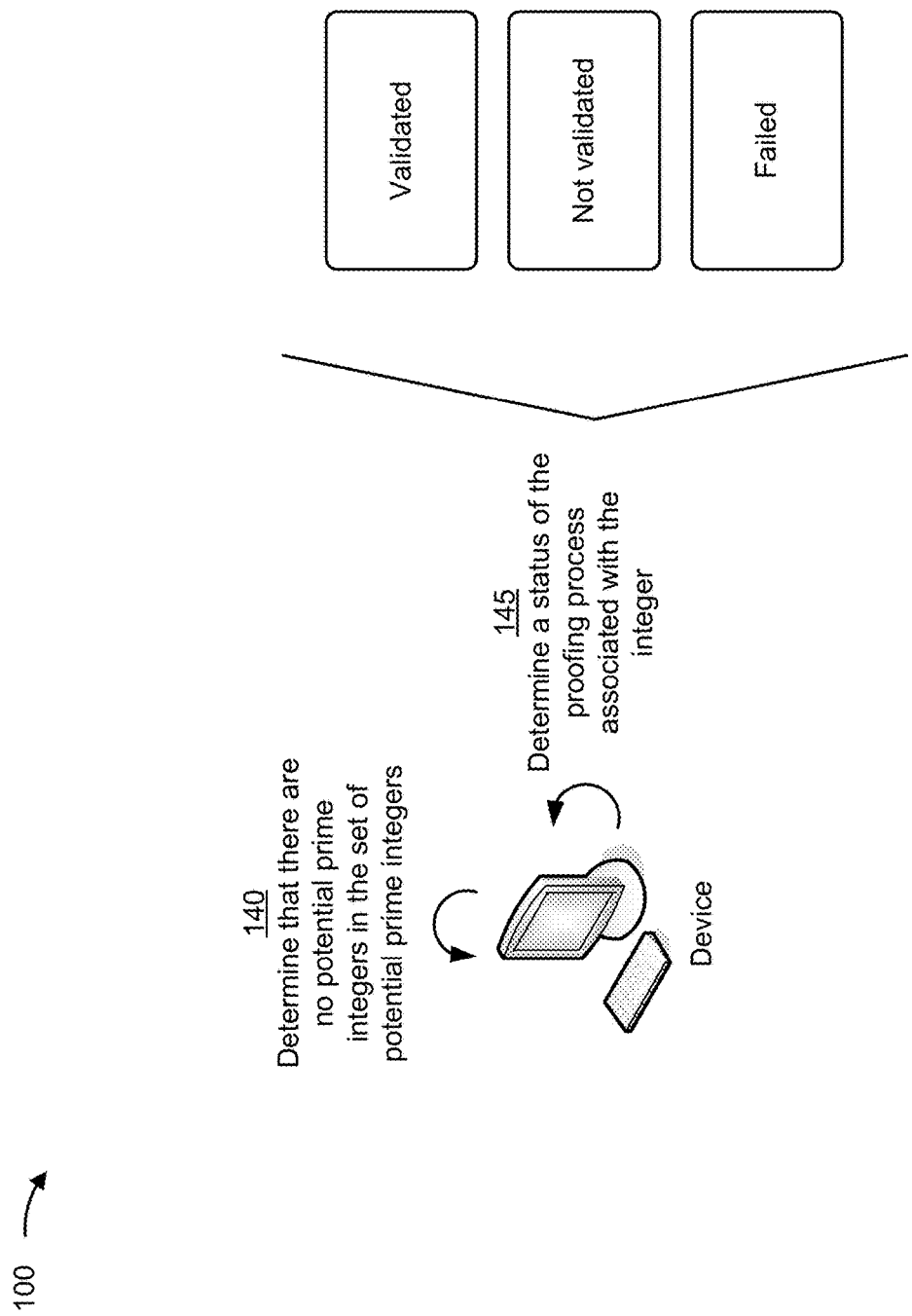

In this way, the device may process, iteratively and in order, each potential prime integer in the set of potential prime integers to determine whether each potential prime integer is a prime integer. As shown in FIG. 1E, and by reference number 140, the device may determine (e.g., after processing each potential prime integer in the set of potential prime integers) that there are no potential prime integers left in the set of potential prime integers. For example, the device may determine that the linked list of potential prime integers does not include any entry (e.g., and that therefore the device has processed each potential prime integer that was included in the linked list).

Accordingly, as further shown in FIG. 1E, and by reference number 145, the device may determine the status of the proofing process (e.g., based on determining whether each potential prime integer that was included in the set of potential prime integers is a prime integer). For example, the device may determine that the validation status is validated based on determining that there are no potential prime integers left in the set of potential prime integers and that only the integer for the cryptographic protocol is included in the set of proven prime integers. As another example, the device may determine that the validation status is not validated (e.g., based on determining that a potential prime integer included in the set of potential prime integers is not a prime integer, as described above in relation to FIGS. 1C-1D). In another example, the device may determine that the validation status is failed (e.g., based on determining that a potential prime integer has not been proven to be a prime integer, as described above in relation to FIGS. 1C-1D).

In some implementations, the device may use an algorithm to perform the proofing process to determine whether the integer may be used in association with a cryptographic protocol (e.g., the device may use an algorithm to perform one or more of the processing steps described in relation to FIGS. 1A-1E). For example, the device may use Algorithm 1:

---

Algorithm 1

---

I: Set status = 1, primes = 0, qDiv = 1, qRem = 1, q = 1, P = 1, g = 1, and num = 1
II: while proof ≠ 0 and status = 1
  A:
    1: P = proof:p
    2: g = proof:gen
    3: num = proof:numChild
    4: proof = proof:next
  B: If num = 0
    1: if P is in smallP then primes = getNewPrime(P, primes)
    2: else status = 0
  C. else:
    1: qrem = P-1, qDiv = 1
    2: if $g^{qRem} \neq 1 \mod P$ then status = 0
    3: j = 0
    4: while j < num and status = 1
      a: if primes = 0 then status = −1
      b: else:
        i: q = primes:q, primes = primes:next
        ii: if $P \neq 1 \mod q$ then status = −1
        iii: else:
          while qRem = 0 module q
            qRem = qRem/q
            qDiv=qDiv * q $$\text{if } \gcd\left(\left(g^{\frac{P-1}{q}} - 1 \bmod P\right), P\right) \neq 1 \text{ then status} = 0$$

c: j = j + 1

Algorithm 1

```
5: If Algorithm 2 with qRem, qDiv returns false
   then status = −1
6: else: primes = getNewPrime(P,primes)
III: Return status and primes.
```

Input into Algorithm 1 may include proof, which is a pointer to a first PossiblePrime in a proof list (e.g., a set of possible prime integers) that includes the integer to be used in the cryptographic protocol and smallP, which is a list of small proven primes (e.g., a set of stored primed integers), such as primes generated with the sieve of Eratosthenes. The output of Algorithm 1 is the status (e.g., the prime validation status) of the integer, where −1 indicates an incorrectly structured prime proof tree of integer, 0 indicates that that the prime proof for the integer has failed, and 1 indicates that the integer has been validated as prime. The output may also include a primes pointer to a list of proven primes that contains the integer (e.g., when the status is 1) or is nil (e.g., when the status is −1 or 0).

As shown in operation I, algorithm 1 may set the status to 1 (e.g., indicating success); the primes to point to an empty list of proven primes; qDiv, which stores the product of prime divisors of a currently tested prime minus 1, to 1; qRem, which stores the remaining integer after dividing the currently tested prime minus 1 by qDiv, to 1; q, which stores a currently known prime that is being used at a current stage of algorithm 1, to 1; P, which stores the currently tested prime, to 1; g, which stores a base used to test the currently tested prime, to 1; and num, which stores a number of primes used to prove P is prime, to 1. As shown in operation II, algorithm 1 may continue to run while there are primes left to check in the proof list and no errors have occurred.

As shown in operation IIA, algorithm 1 may obtain new values for P, g, num, and remove the current entry from the proof list. As shown in operation JIB, when P does not have any child primes (e.g., num=0), algorithm 1 may determine if P is in the smallP list of small proven primes. If so, algorithm 1 may cause P to be added to the primes list of proven primes (e.g., via the getNewPrime function). Otherwise, algorithm may cause the status to be 0, which indicates that that the prime proof for the integer has failed.

As shown in operation II.C, algorithm 1 may determine whether P satisfies a primality test. As shown in operation II.C.1, qRem and qDiv may be initialized. As shown in operation II.C.2, algorithm 1 may cause the status to be 0, which indicates that that the prime proof for the integer has failed, if P fails Fermat's primality test. Otherwise, as shown in operations II.C.3-4, algorithm 1 may test whether all the child primes of P prove primality of P. For example, as shown in operation II.C.4.b.ii, if a child prime q of P of P fails a first part of Pocklington's primality test, algorithm 1 may cause the status to be −1, which indicates an incorrectly structured prime proof tree. As another example, as shown in operation II.C.4.b.iii, if a child prime q of P fails a second part of Pocklington's primality test, algorithm may cause the status to be 0, which indicates that that the prime proof for P has failed.

As shown in operation II.5, algorithm 1 may call algorithm 2 (e.g., described herein and associated with Pocklington's extension test) and may cause the status to be −1, which indicates an incorrectly structured prime proof tree, if Pocklington's extension test is failed. Otherwise, algorithm 1 may cause P to be added to the primes list of proven primes (e.g., via the getNewPrime function). Algorithm 1 may continue in this way until returning the status and primes as shown in operation III.

The Pocklington extension test is shown below as Algorithm 2. The device may input a random portion of the tested prime P (h) and a known portion of the tested prime P (R). Algorithm 2 may output true if the tested prime P is prime or false if the tested prime P is composite.

I:
Constants: A small set of primes $\{q_j | 0 \le j < 1000\}$, with $q_0=5$, $q_1=7$, and so on.
Set status=false
If h<R, return true, else if h>R², return false
II: Set b=(h mod R)²
III: Set $$a = 4 \cdot \left[\frac{h}{R}\right]$$

IV: If b<a: neg=true; val=a−b
V: Else neg=false; val=b−a
VI: Set j=0
VII: While j<1000 and status=false
  A: Compute $$v = val^{\frac{q_j-1}{2}} \bmod q_j$$

B: If neg is true:
    1: If $(q_j-1)/2$ is odd and v=1: status=true
    2: Else $(q_j-1)/2$ is even and $v=q_j-1$: status=true
  C: Else if $v=(q_j-1)$: status=true
  D: j=j+1
Algorithm 2

As shown in operation I, the status may indicate whether the device has determined, using Algorithm 2, that the tested integer P is prime. Initially, the status may be set to false until the tested integer P fails a quadratic residue test. At operation IV, Algorithm 2 may determine a difference between b and a and account for the difference being negative or positive. As shown at operation VII.B, Algorithm 2 may determine whether the tested integer P is prime based on the difference between b and a being negative. As shown at operation VII.C, Algorithm 2 may determine whether the tested integer P is prime based on the difference between b and a being positive.

Figure 1F:
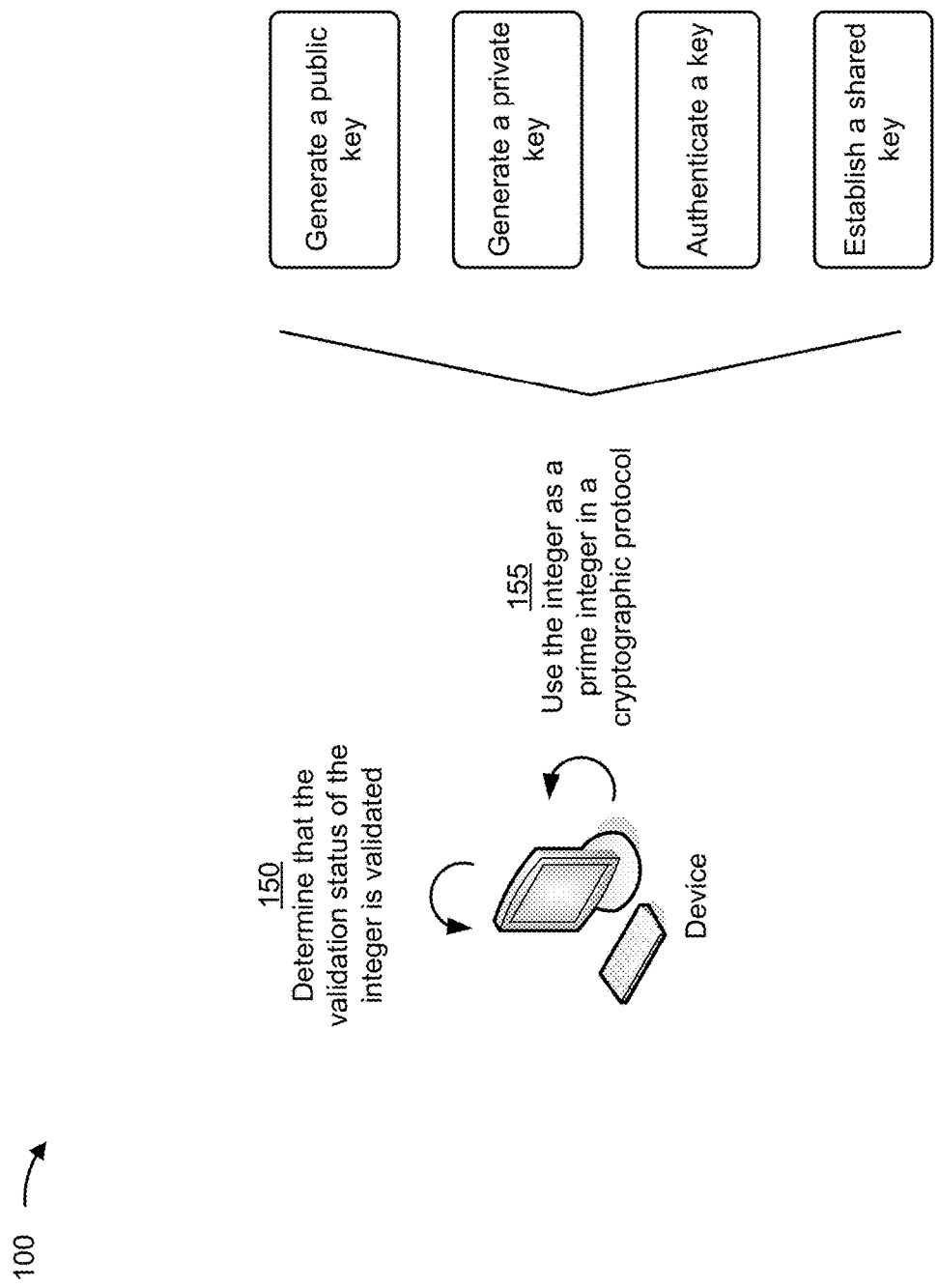

As shown in FIG. 1F, and by reference number 150, the device may determine that the validation status of the integer to be used in the cryptographic protocol is validated (e.g., based on performing one or more processing steps associated with FIGS. 1A-1E, running algorithm 1 and/or 2, and/or the like). Accordingly, as further shown in FIG. 1F, and by reference number 155, the device may use the integer as a prime integer in the cryptographic protocol. For example, the device may use the integer to generate a public key, generate a private key, authenticate a key, establish a shared key, and/or the like, in the cryptographic protocol.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
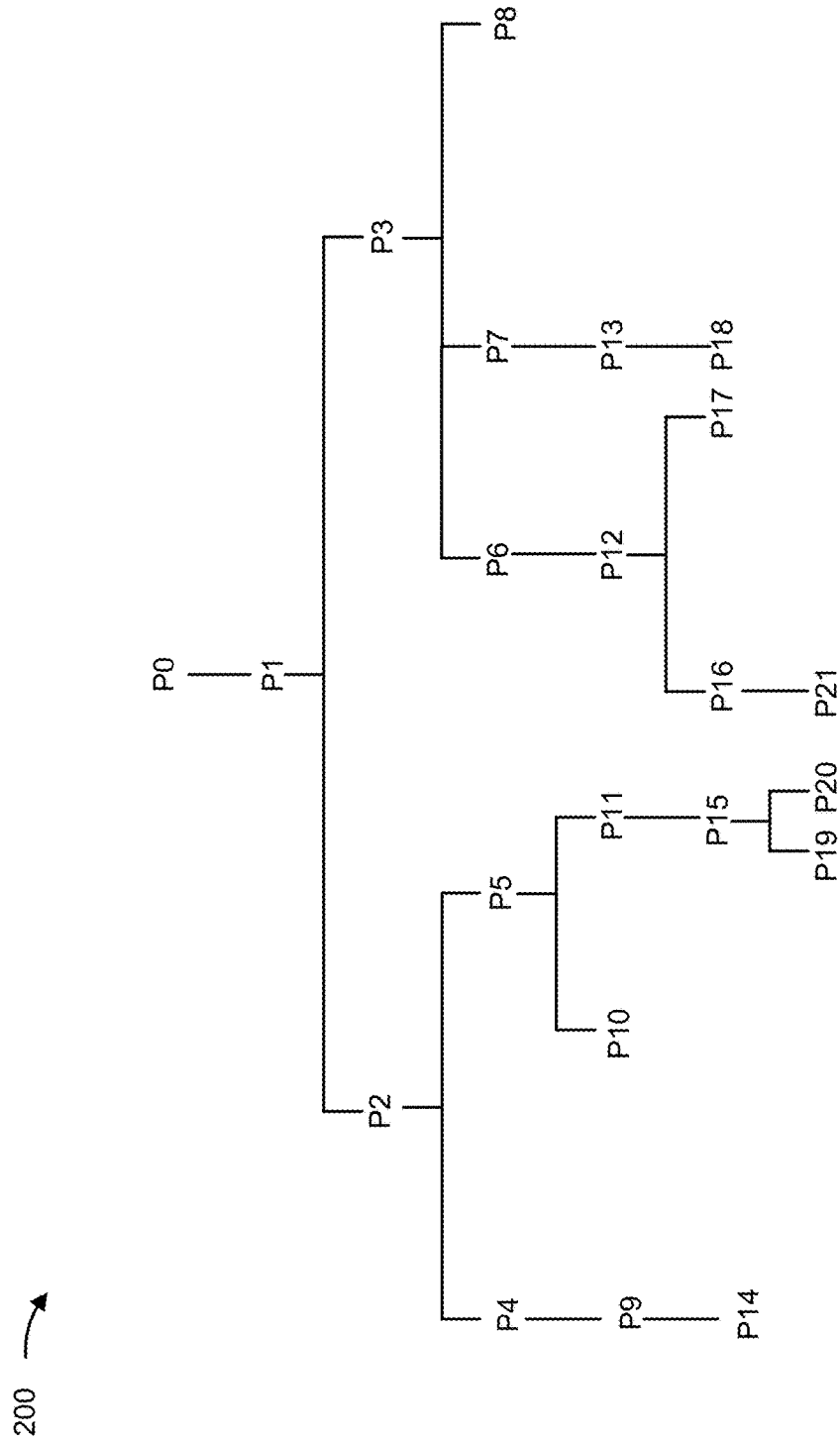
FIG. 2 is a diagram of an example prime proof tree described herein.

FIG. 2 is a diagram 200 of an example prime proof tree that include prime integers P0-21. As shown in FIG. 2, a prime integer at a particular level may be proven to be prime, according to Pocklington's primality test, using one or more child prime integers of the prime integer. For example, P0 may be proven using P1; P1 may be proven using P2 and P3; P2 may be proven using P4 and P5; P3 may be proven using P6, P7, and P8; P4 may be proven using P9; P5 may be proven using P10 and P11; P6 may be proven using P12; P7 may be proven using P13; P9 may be proven by P14; P11 may be proven using P15; P12 may be proven using P16 and P17; P13 may be proven using P18; and P15 may be proven using P19 and P20; P16 may be proven using P21. Notably, P8, P10, P14, P17, P18, P19, P20, and P21 may be "small" known primes that do not need to be proven using another prime.

In some implementations, the linked list described herein (e.g., in relation to FIGS. 1A-1F) may be structured to be a representation of a prime proof tree, such that an entry associated with a particular prime integer is preceded by the child prime integers of the particular prime integer in the linked list. For example, one example linked list that represents the example prime proof tree illustrated in FIG. 2, may cause entries associated with primes P1-21 to be linked in the following order: P14, P9, P4, P10, P19, P20, P15, P11, P5, P2, P21, P16, P17, P12, P6, P18, P13, P7, P8, P3, P1, and P0. In this way, the device may process the example linked list (e.g., using one or more processing steps described herein in relation to FIGS. 1A-1F, algorithms 1 and 2, and/or the like) to determine whether P0 may be used in association with a cryptographic protocol.

As indicated above, FIG. 2 is provided as an example. Other examples may differ from what is described with regard to FIG. 2.

Figure 3:
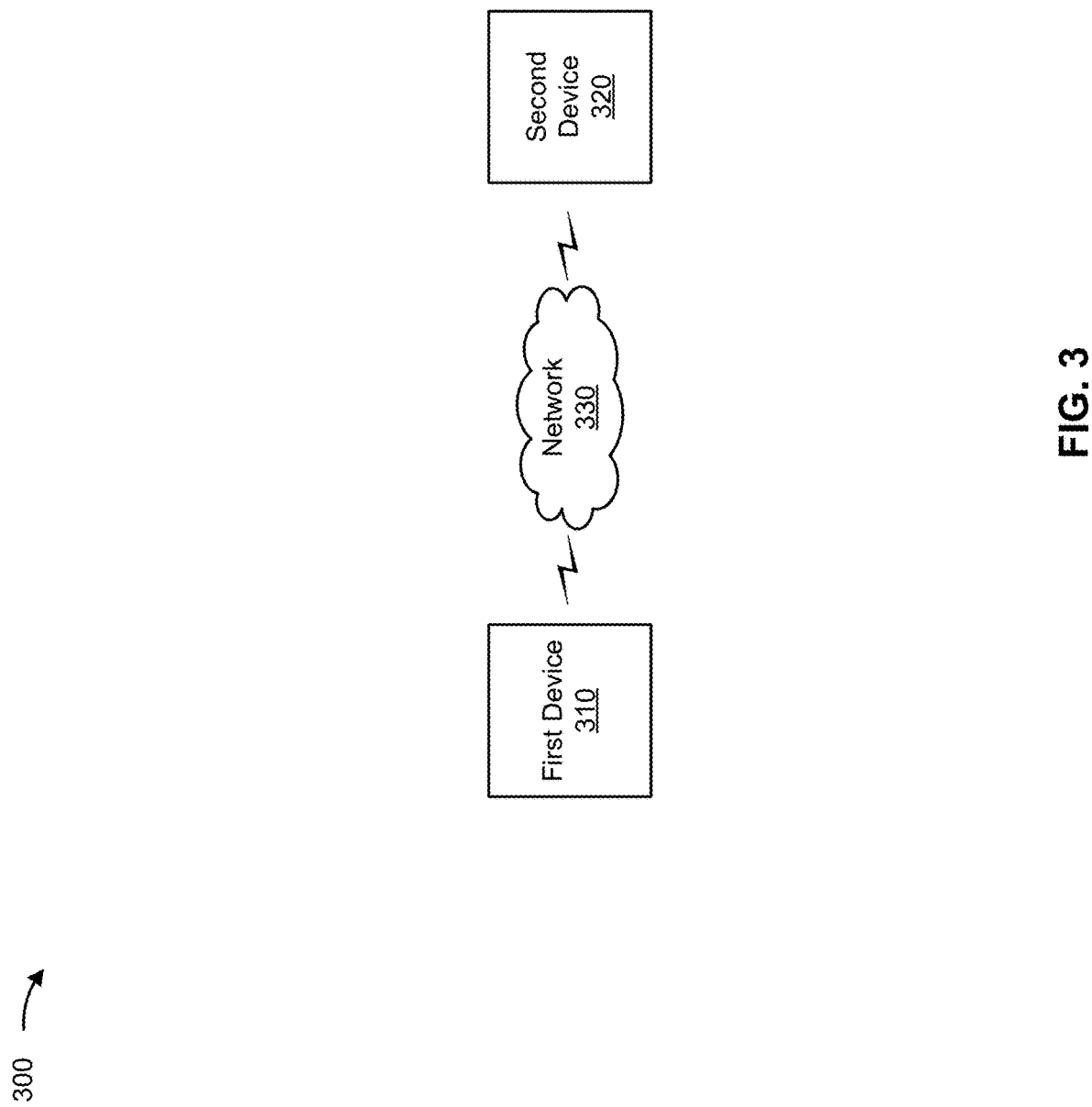
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a first device 310, a second device 320, and a network 330. Devices of environment 300 may interconnect via wired connections, wireless connections, or a combination of wired and wireless connections.

The first device 310 includes one or more devices capable of receiving, generating, storing, processing, and/or providing information as describe herein. The first device 310 may include a communication device and/or a computing device. For example, the first device 310 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The first device 310 may communicate with one or more other devices of environment 300, as described elsewhere herein.

The second device 320 includes one or more devices capable of receiving, generating, storing, processing, and/or providing information as described herein. The second device 320 may include a communication device and/or a computing device. For example, the second device 320 may include a wireless communication device, a UE, a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an IoT device, or a similar type of device. The second device 320 may communicate with one or more other devices of environment 300, as described elsewhere herein.

The network 330 includes one or more wired and/or wireless networks. For example, the network 330 may include a cellular network (e.g., a fifth generation (5G) network, a fourth generation (4G) network, a long-term evolution (LTE) network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 330 enables communication among the devices of environment 300.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
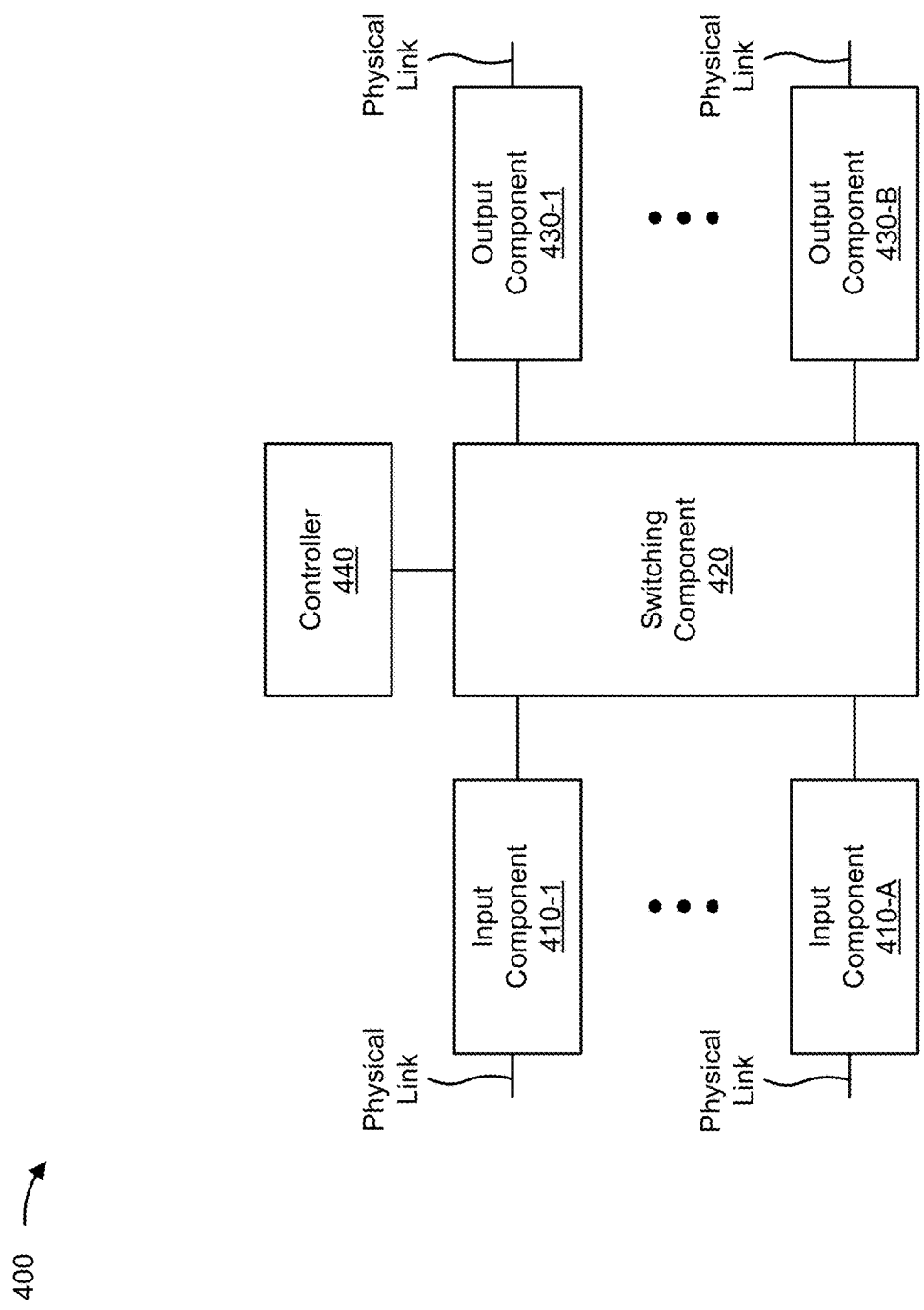
FIG. 4-5 are diagrams of example components of one or more devices of FIG. 3.

FIG. 4 is a diagram of example components of a device 400. Device 400 may correspond to the first device 310 and/or the second device 320. In some implementations, the first device 310 and/or the second device 320, may include one or more devices 400 and/or one or more components of device 400. As shown in FIG. 4, device 400 may include one or more input components 410-1 through 410-A (A≥1) (hereinafter referred to collectively as input components 410, and individually as input component 410), a switching component 420, one or more output components 430-1 through 430-B (B≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
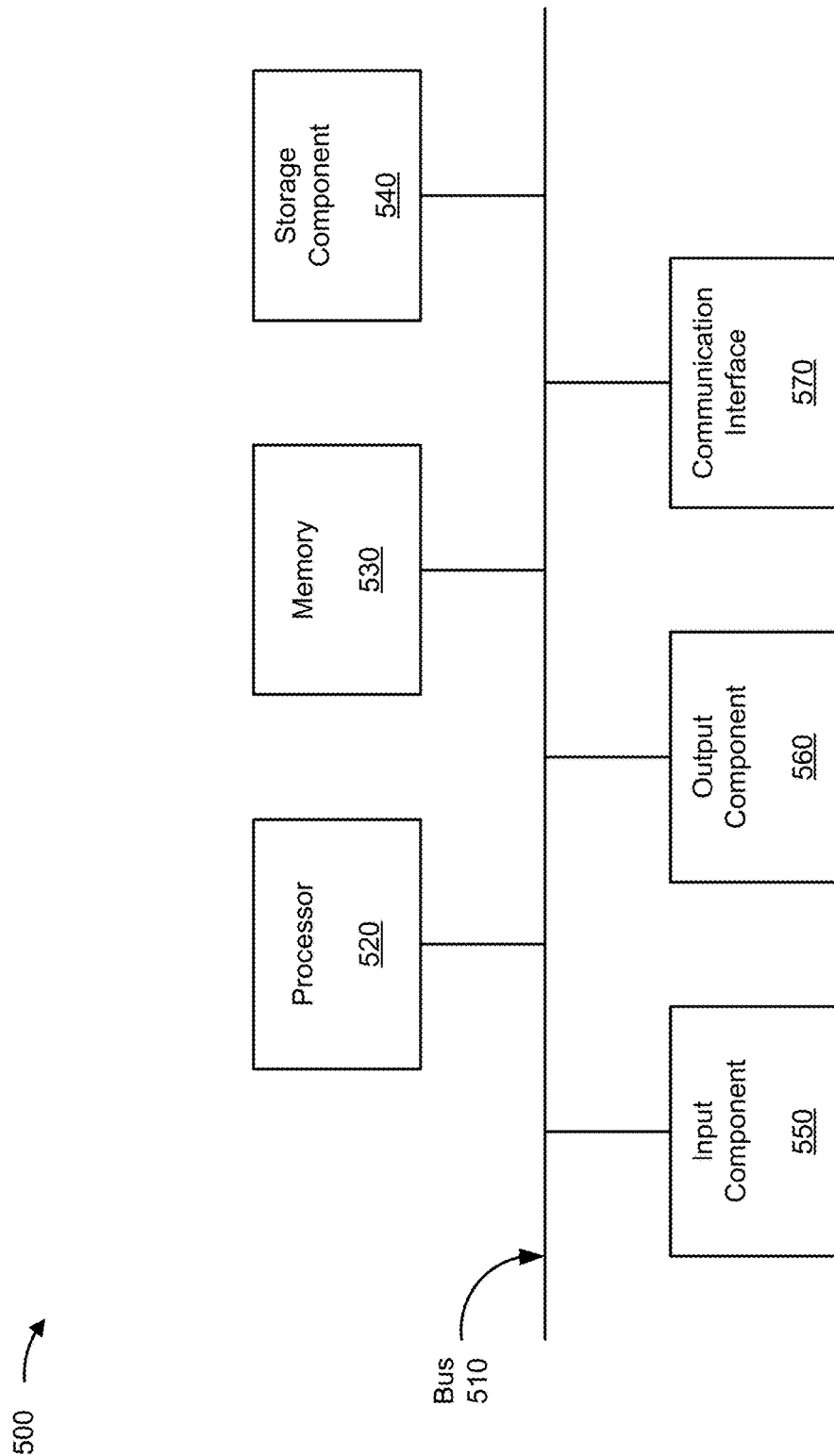

FIG. 5 is a diagram of example components of a device 500, which may correspond to the first device 310 and/or the second device 320. In some implementations, the first device 310 and/or the second device 320 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory), a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, an actuator, and/or the like. Output component 560 enables device 500 to provide output, such as via a display, a speaker, and/or one or more light-emitting diodes. Communication interface 570 enables device 500 to communicate with other devices, such as via a wired connection and/or a wireless connection. For example, communication interface 570 may include a receiver, a transmitter, a transceiver, a modem, a network interface card, an antenna, and/or the like.

Device 500 may perform one or more processes described herein. For example, a non-transitory computer-readable medium (e.g., memory 530 and/or storage component 540) may store a set of instructions (e.g., one or more instructions, code, software code, program code, and/or the like) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
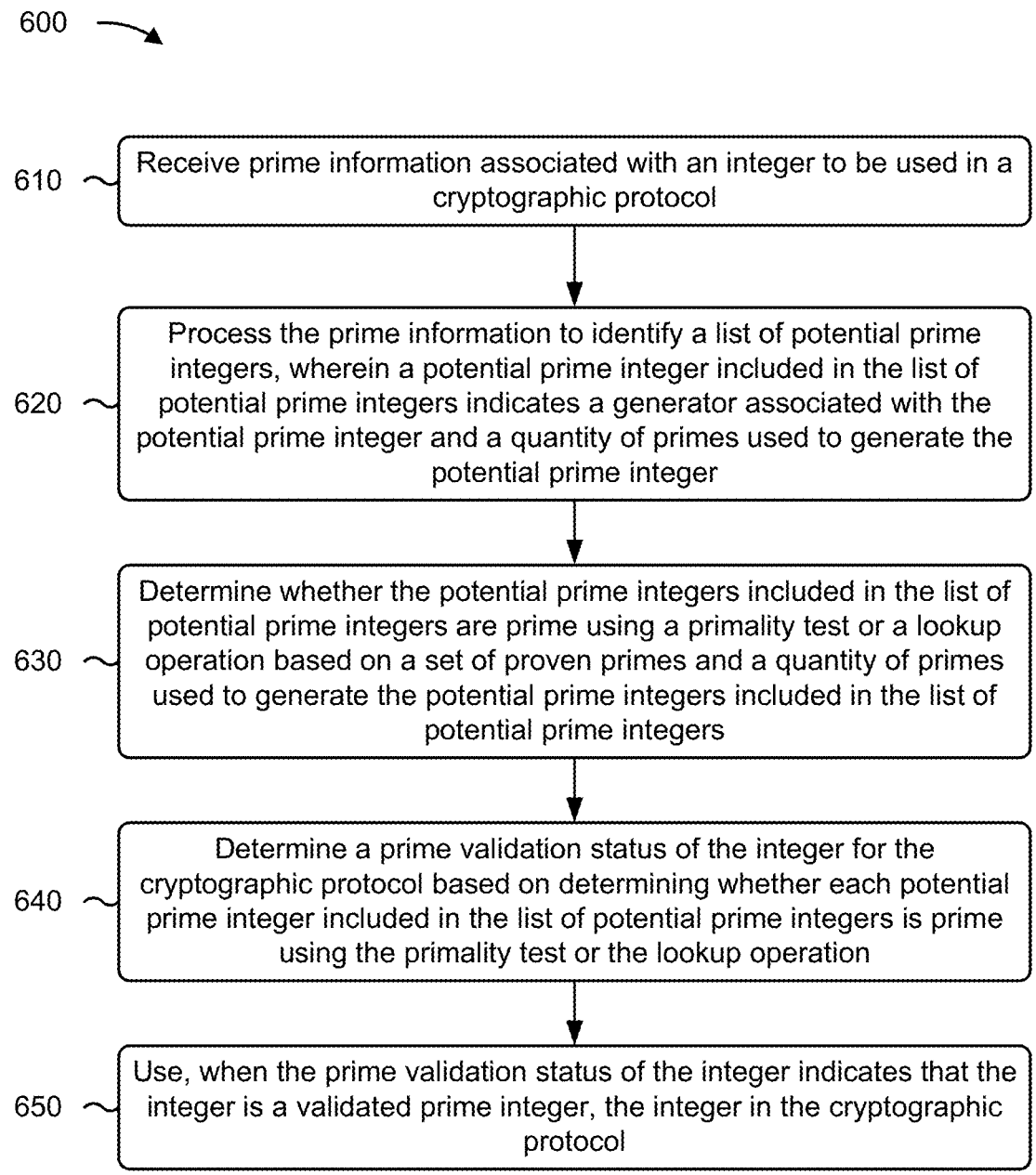
FIGS. 6-8 are flow charts of example processes relating to proving prime integers for encryption.

FIG. 6 is a flow chart of an example process 600 associated with proving prime integers for encryption. In some implementations, one or more process blocks of FIG. 6 may be performed by a device (e.g., first device 310). In some implementations, one or more process blocks of FIG. 6 may be performed by another device or a group of devices separate from or including the device, such as another device (e.g., second device 320) and/or the like. Additionally, or alternatively, one or more process blocks of FIG. 6 may be performed by one or more components of a device 400, such as input component 410, switching component 420, output component 430, controller 440, and/or the like; device 500, such as processor 520, memory 530, storage component 540, input component 550, output component 560, communication interface 570, and/or the like; and/or the like.

As shown in FIG. 6, process 600 may include receiving prime information associated with an integer to be used in a cryptographic protocol (block 610). For example, the device may receive prime information associated with an integer to be used in a cryptographic protocol, as described above.

As further shown in FIG. 6, process 600 may include processing the prime information to identify a list of potential prime integers, wherein a potential prime integer included in the list of potential prime integers indicates a generator associated with the potential prime integer and a quantity of primes used to generate the potential prime integer (block 620). For example, the device may process the prime information to identify a list of potential prime integers, as described above. In some implementations, a potential prime integer included in the list of potential prime integers indicates a generator associated with the potential prime integer and a quantity of primes used to generate the potential prime integer.

As further shown in FIG. 6, process 600 may include determining whether the potential prime integers included in the list of potential prime integers are prime using a primality test or a lookup operation based on a set of proven prime integers and a quantity of primes used to generate the potential prime integers included in the list of potential prime integers (block 630). For example, the device may determine whether the potential prime integers included in the list of potential prime integers are prime using a primality test or a lookup operation based on a set of proven prime integers and a quantity of primes used to generate the potential prime integers included in the list of potential prime integers, as described above.

As further shown in FIG. 6, process 600 may include determining a prime validation status of the integer for the cryptographic protocol based on determining whether each potential prime integer included in the list of potential prime integers is prime using the primality test or the lookup operation (block 640). For example, the device may determine a prime validation status of the integer for the cryptographic protocol based on determining whether each potential prime integer included in the list of potential prime integers is prime using the primality test or the lookup operation, as described above.

As further shown in FIG. 6, process 600 may include using, when the prime validation status of the integer indicates that the integer is a validated prime integer, the integer in the cryptographic protocol (block 650). For example, the device may use, when the prime validation status of the integer indicates that the integer is a validated prime integer, the integer in the cryptographic protocol, as described above.

Process 600 may include additional implementations, such as any single implementation or any combination of implementations described below and/or in connection with one or more other processes described elsewhere herein.

In a first implementation, receiving the prime information associated with the integer for the cryptographic protocol comprises: identifying a linked list of prime information associated with the prime information indicating integers associated with generating the integer using a provable prime generation technique, wherein the linked list of prime information is ordered such that each prime used to generate a particular prime in the linked list of prime information is listed before the particular prime in the linked list of prime information.

In a second implementation, alone or in combination with the first implementation, the primality test comprises a Pocklington primality test.

In a third implementation, alone or in combination with one or more of the first and second implementations, determining the prime validation status of the integer for the cryptographic protocol comprises determining that the integer is a prime integer; determining that a subgroup size of a subgroup associated with the integer satisfies a threshold; determining that an order of the subgroup associated with the integer is prime; and determining that a generator associated with the integer has a same order as the subgroup associated with the integer.

In a fourth implementation, alone or in combination with one or more of the first through third implementations, determining whether the potential prime integers included in the list of potential prime integers are prime using a primality test or lookup operation comprises determining that a quantity of primes used to generate a first potential prime integer included in the list of potential prime integers is zero; performing the lookup operation in a set of stored prime integers to identify the first potential prime integer in the set of stored prime integers; determining that the first potential prime integer is a prime integer based on performing the lookup operation; adding the first potential prime integer to the set of proven prime integers, and removing the first potential prime integer from the list of potential prime integers.

In a fifth implementation, alone or in combination with one or more of the first through fourth implementations, determining whether the potential prime integers included in the list of potential prime integers are prime using a primality test comprises determining a quantity of primes used to generate a next potential prime integer included in the list of potential prime integers; removing one or more primes from the set of proven prime integers, wherein a quantity of the one or more primes from the set of proven prime integers is the same as the quantity of primes used to generate the next potential prime integer; determining that the next potential prime integer satisfies the primality test using the one or more primes from the set of proven prime integers; adding the next potential prime integer to the set of proven prime integers, and removing the next potential prime integer from the list of potential prime integers.

In a sixth implementation, alone or in combination with one or more of the first through fifth implementations, determining a validation status of the integer for the cryptographic protocol comprises determining that the validation status of the integer for the cryptographic protocol is: validated, based on a determination that there are no potential prime integers remaining in the list of potential prime integers and that only the integer for the cryptographic protocol is included in the set of proven prime integers; not validated, based on a determination that a potential prime integer included in the list of potential prime integers is not prime using the primality test or the lookup operation; or failed, based on a determination that the device is unable to determine whether a potential prime integer included in the list of potential prime integers is prime using the primality test or the lookup operation.

In a seventh implementation, alone or in combination with one or more of the first through sixth implementations, the cryptographic protocol is a discrete logarithm-based public key cryptographic protocol.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
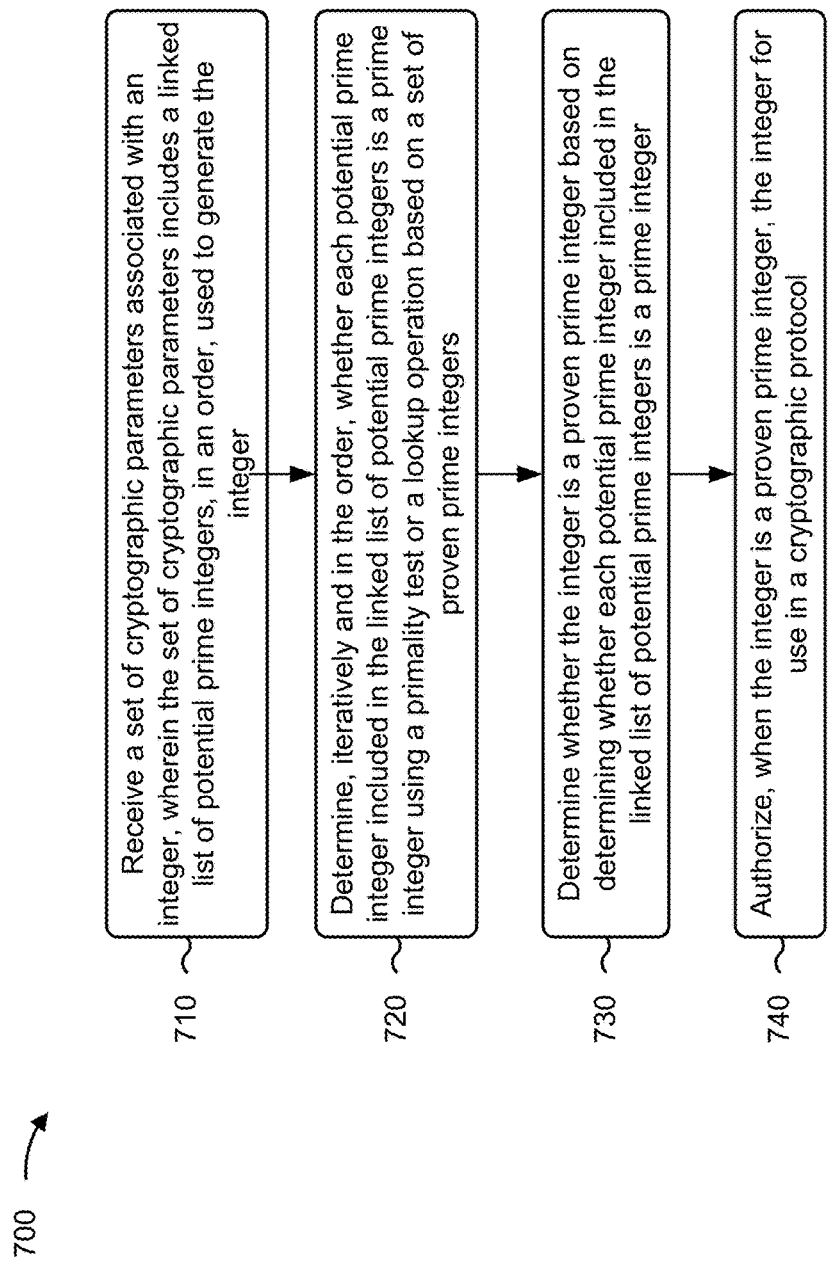

FIG. 7 is a flow chart of an example process 700 associated with proving prime integers for encryption. In some implementations, one or more process blocks of FIG. 7 may be performed by a device (e.g., first device 310). In some implementations, one or more process blocks of FIG. 7 may be performed by another device or a group of devices separate from or including the device, such as another device (e.g., second device 320) and/or the like. Additionally, or alternatively, one or more process blocks of FIG. 7 may be performed by one or more components of a device 400, such as input component 410, switching component 420, output component 430, controller 440, and/or the like; device 500, such as processor 520, memory 530, storage component 540, input component 550, output component 560, communication interface 570, and/or the like; and/or the like.

As shown in FIG. 7, process 700 may include receiving a set of cryptographic parameters associated with an integer, wherein the set of cryptographic parameters includes a linked list of potential prime integers, in an order, used to generate the integer (block 710). For example, the device may receive a set of cryptographic parameters associated with an integer, as described above. In some implementations, the set of cryptographic parameters includes a linked list of potential prime integers, in an order, used to generate the integer.

As further shown in FIG. 7, process 700 may include determining, iteratively and in the order, whether each potential prime integer included in the linked list of potential prime integers is a prime integer using a primality test or a lookup operation based on a set of proven prime integers (block 720). For example, the device may determine, iteratively and in the order, whether each potential prime integer included in the linked list of potential prime integers is a prime integer using a primality test or a lookup operation based on a set of proven prime integers, as described above.

As further shown in FIG. 7, process 700 may include determining whether the integer is a proven prime integer based on determining whether each potential prime integer included in the linked list of potential prime integers is a prime integer (block 730). For example, the device may determine whether the integer is a proven prime integer based on determining whether each potential prime integer included in the linked list of potential prime integers is a prime integer, as described above.

As further shown in FIG. 7, process 700 may include authorizing, when the integer is a proven prime integer, the integer for use in a cryptographic protocol (block 740). For example, the device may authorize, when the integer is a proven prime integer, the integer for use in a cryptographic protocol, as described above.

Process 700 may include additional implementations, such as any single implementation or any combination of implementations described below and/or in connection with one or more other processes described elsewhere herein.

In a first implementation, the order is based on a determination that one or more prime integers included in the linked list of potential prime integers are required to be proven to determine whether another potential prime integer included in the linked list of potential prime integers is a prime integer.

In a second implementation, alone or in combination with the first implementation, determining whether the integer is a proven prime integer includes determining that the integer is a prime integer using the primality test or the lookup operation; determining that a subgroup size of a subgroup associated with the integer satisfies a threshold; determining that an order of the subgroup associated with the integer is prime; and determining that a generator associated with the integer has a same order as the subgroup associated with the integer.

In a third implementation, alone or in combination with one or more of the first and second implementations, determining whether each potential prime integer included in the linked list of potential prime integers is a prime integer using the primality test or the lookup operation includes determining that a quantity of primes used to generate a first potential prime integer included in the linked list of potential prime integers is zero; performing the lookup operation in a set of known prime integers to determine whether the first potential prime integer is included in the set of known prime integers; determining that the first potential prime integer is a prime integer based on performing the lookup operation; adding the first potential prime integer to the set of proven prime integers; and removing the first potential prime integer from the linked list of potential prime integers.

In a fourth implementation, alone or in combination with one or more of the first through third implementations, determining whether each potential prime integer included in the linked list of potential prime integers is a prime integer using the primality test or the lookup operation includes determining a quantity of primes used to generate a next potential prime integer included in the linked list of potential prime integers; removing one or more prime integers from the set of proven prime integers, wherein a quantity of the one or more prime integers from the set of proven prime integers is being the same as the quantity of primes used to generate the next potential prime integer, and wherein the one or more prime integers from the set of proven prime integers is being most recently added prime integers to the set of proven prime integers; determining that the next potential prime integer satisfies the primality test using the one or more prime integers removed from the set of proven prime integers; adding the next potential prime integer to the set of proven prime integers; and removing the next potential prime integer from the linked list of potential prime integers.

In a fifth implementation, alone or in combination with one or more of the first through fourth implementations, determining whether the integer is a proven prime integer includes determining a status associated with the integer, wherein the status is indicating a proving process associated with determining whether the integer is a proven prime integer is: successful, is basing on a determination that there are no potential prime integers remaining in the linked list of potential prime integers and that only the integer is included in the set of proven prime integers, not successful, is basing on a determination that a potential prime integer included in the linked list of potential prime integers is not prime using the primality test or the lookup operation, or failed, based on a determination that the device is unable to determine whether a potential prime integer included in the linked list of potential prime integers is a prime integer using the primality test or the lookup operation.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
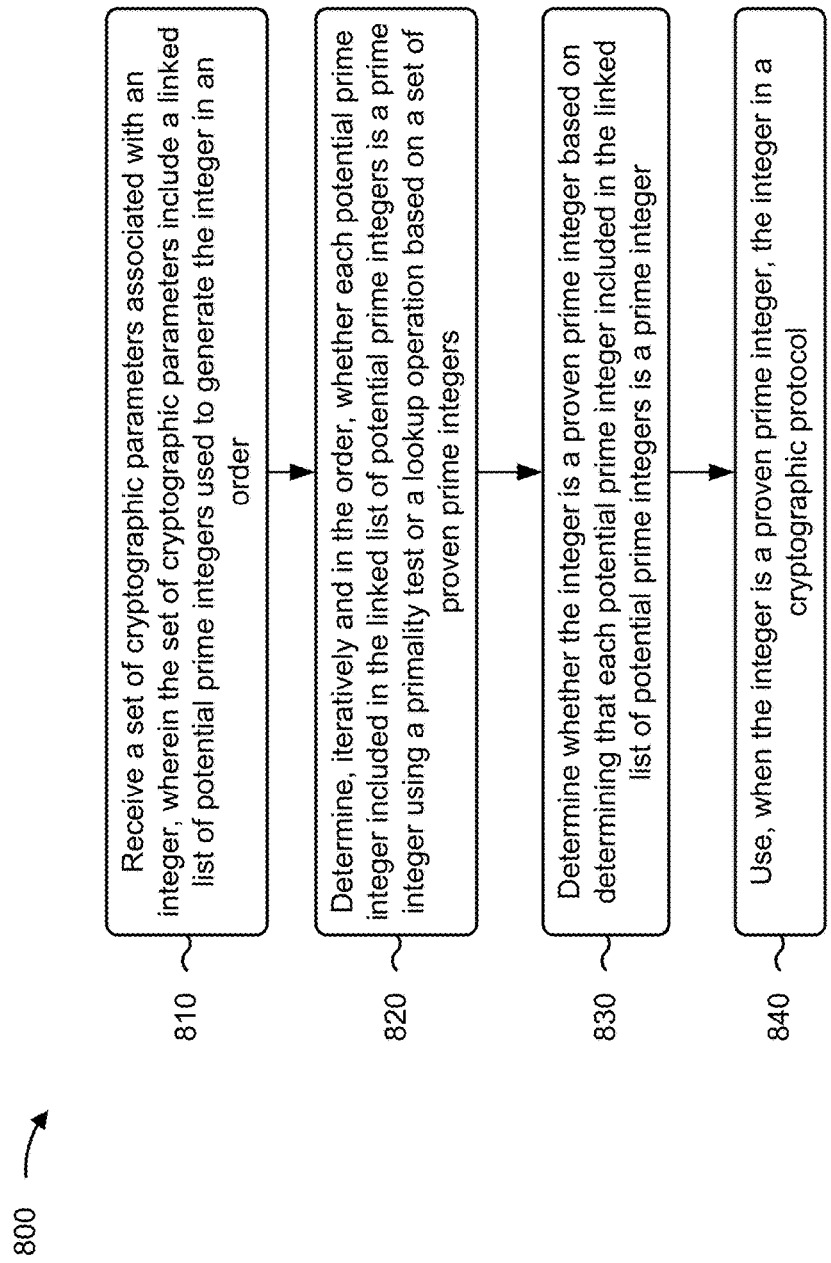

FIG. 8 is a flow chart of an example process 800 associated with proving prime integers for encryption. In some implementations, one or more process blocks of FIG. 8 may be performed by a device (e.g., first device 310). In some implementations, one or more process blocks of FIG. 8 may be performed by another device or a group of devices separate from or including the device, such as another device (e.g., second device 320) and/or the like. Additionally, or alternatively, one or more process blocks of FIG. 8 may be performed by one or more components of a device 400, such as input component 410, switching component 420, output component 430, controller 440, and/or the like; device 500, such as processor 520, memory 530, storage component 540, input component 550, output component 560, communication interface 570, and/or the like; and/or the like.

As shown in FIG. 8, process 800 may include receiving a set of cryptographic parameters associated with an integer, wherein the set of cryptographic parameters include a linked list of potential prime integers used to generate the integer in an order (block 810). For example, the device may receive a set of cryptographic parameters associated with an integer, as described above. In some implementations, the set of cryptographic parameters include a linked list of potential prime integers used to generate the integer in an order.

As further shown in FIG. 8, process 800 may include determining, iteratively and in the order, whether each potential prime integer included in the linked list of potential prime integers is a prime integer using a primality test or a lookup operation based on a set of proven prime integers (block 820). For example, the device may determine, iteratively and in the order, whether each potential prime integer included in the linked list of potential prime integers is a prime integer using a primality test or a lookup operation based on a set of proven prime integers, as described above.

As further shown in FIG. 8, process 800 may include determining whether the integer is a proven prime integer based on determining that each potential prime integer included in the linked list of potential prime integers is a prime integer (block 830). For example, the device may determine whether the integer is a proven prime integer based on determining that each potential prime integer included in the linked list of potential prime integers is a prime integer, as described above.

As further shown in FIG. 8, process 800 may include using, when the integer is a proven prime integer, the integer in a cryptographic protocol (block 840). For example, the device may use, when the integer is a proven prime integer, the integer in a cryptographic protocol, as described above.

Process 800 may include additional implementations, such as any single implementation or any combination of implementations described below and/or in connection with one or more other processes described elsewhere herein.

In a first implementation, the order is based on a determination that one or more prime integers included in the linked list of potential prime integers are required to be proven to determine whether another potential prime integer included in the linked list of potential prime integers is a prime integer.

In a second implementation, alone or in combination with the first implementation, determining whether the integer is a proven prime integer includes determining that the integer is a prime integer using the primality test or the lookup operation; determining that a subgroup size of a subgroup associated with the integer satisfies a threshold; determining that an order of the subgroup associated with the integer is prime; and determining that a generator associated with the integer has a same order as the subgroup associated with the integer.

In a third implementation, alone or in combination with one or more of the first and second implementations, determining whether each potential prime integer included in the linked list of potential prime integers is a prime integer using the primality test or the lookup operation includes determining that a quantity of primes used to generate a next potential prime integer included in the linked list of potential prime integers is zero; performing the lookup operation in a set of known prime integers to determine whether the next potential prime integer is included in the set of known prime integers; determining that the next potential prime integer is a prime integer based on performing the lookup operation; adding the next potential prime integer to the set of proven prime integers; and removing the next potential prime integer from the linked list of potential prime integers.

In a fourth implementation, alone or in combination with one or more of the first through third implementations, determining whether each potential prime integer included in the linked list of potential prime integers is a prime integer using the primality test or the lookup operation includes determining a quantity of child primes associated with a next potential prime integer included in the linked list of potential prime integers; removing one or more prime integers from the set of proven prime integers, wherein a quantity of the one or more prime integers from the set of proven prime integers is being the same as the quantity of child primes associated with the next potential prime integer; determining that the next potential prime integer satisfies the primality test using the one or more prime integers from the set of proven prime integers; adding the next potential prime integer to the set of proven prime integers; and removing the next potential prime integer from the linked list of potential prime integers.

In a fifth implementation, alone or in combination with one or more of the first through fourth implementations, determining whether the integer is a proven prime integer includes determining a status associated with the integer, wherein the status is indicating a proving process associated with determining whether the integer is a proven prime integer is: successful, is basing on a determination that there are no potential prime integers remaining in the linked list of potential prime integers and that only the integer is included in the set of proven prime integers, not successful, is basing on a determination that a potential prime integer included in the linked list of potential prime integers is not prime using the primality test or the lookup operation, or failed, based on a determination that a prime status of one or more potential prime integers included in the linked list of potential prime integers cannot be determined.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, prime information associated with an integer to be used in a cryptographic protocol;
    processing the prime information to identify a list of potential prime integers,
        wherein a potential prime integer included in the list of potential prime integers indicates a generator associated with the potential prime integer and a quantity of primes used to generate the potential prime integer;
    determining whether the potential prime integers included in the list of potential prime integers are prime using a primality test or a lookup operation based on a set of proven prime integers and a quantity of primes used to generate the potential prime integers included in the list of potential prime integers;
    determining a prime validation status of the integer for the cryptographic protocol based on determining whether each potential prime integer included in the list of potential prime integers is prime using the primality test or the lookup operation; and
    using, by the device and when the prime validation status of the integer indicates that the integer is a validated prime integer, the integer in the cryptographic protocol.

2. The method of claim 1, wherein receiving the prime information associated with the integer for the cryptographic protocol comprises:
    identifying a linked list of prime information associated with the prime information indicating integers associated with generating the integer using a provable prime generation technique,
        wherein the linked list of prime information is ordered such that each prime used to generate a particular prime in the linked list of prime information is listed before the particular prime in the linked list of prime information.

3. The method of claim 1, wherein the primality test comprises a Pocklington primality test.

4. The method of claim 1, wherein determining the prime validation status of the integer for the cryptographic protocol comprises:
    determining that the integer is a prime integer;
    determining that a subgroup size of a subgroup associated with the integer satisfies a threshold;
    determining that an order of the subgroup associated with the integer is prime; and
    determining that a generator associated with the integer has a same order as the subgroup associated with the integer.

5. The method of claim 1, wherein determining whether the potential prime integers included in the list of potential prime integers are prime using the primality test or the lookup operation comprises:
    determining that a quantity of primes used to generate a first potential prime integer included in the list of potential prime integers is zero;
    performing the lookup operation in a set of stored prime integers to identify the first potential prime integer in the set of stored prime integers;
    determining that the first potential prime integer is a prime integer based on performing the lookup operation;
    adding the first potential prime integer to the set of proven prime integers; and
    removing the first potential prime integer from the list of potential prime integers.

6. The method of claim 1, wherein determining whether the potential prime integers included in the list of potential prime integers are prime using the primality test comprises:
    determining a quantity of primes used to generate a next potential prime integer included in the list of potential prime integers;
    removing one or more primes from the set of proven prime integers,
        wherein a quantity of the one or more primes from the set of proven prime integers is the same as the quantity of primes used to generate the next potential prime integer;
    determining that the next potential prime integer satisfies the primality test using the one or more primes from the set of proven prime integers;
    adding the next potential prime integer to the set of proven prime integers; and
    removing the next potential prime integer from the list of potential prime integers.

7. The method of claim 1, wherein determining the validation status of the integer for the cryptographic protocol comprises:
    determining that the validation status of the integer for the cryptographic protocol is:
        validated, based on a determination that there are no potential prime integers remaining in the list of potential prime integers and that only the integer for the cryptographic protocol is included in the set of proven prime integers,
        not validated, based on a determination that a potential prime integer included in the list of potential prime integers is not prime using the primality test or the lookup operation, or
        failed, based on a determination that the device is unable to determine whether a potential prime integer included in the list of potential prime integers is prime using the primality test or the lookup operation.

8. The method of claim 1, wherein the cryptographic protocol is a discrete logarithm-based public key cryptographic protocol.

9. A device, comprising:
    one or more memories; and
    one or more processors to:
    receive a set of cryptographic parameters associated with an integer,
        wherein the set of cryptographic parameters includes a linked list of potential prime integers, in an order, used to generate the integer;
    determine, iteratively and in the order, whether each potential prime integer included in the linked list of potential prime integers is a prime integer using a primality test or a lookup operation based on a set of proven prime integers;
    determine whether the integer is a proven prime integer based on determining whether each potential prime integer included in the linked list of potential prime integers is a prime integer and based on determining a status of a proving process associated with the integer; and
    authorize, when the integer is a proven prime integer, the integer for use in a cryptographic protocol.

10. The device of claim 9, wherein the order is based on a determination that one or more prime integers included in the linked list of potential prime integers are required to be proven to determine whether another potential prime integer included in the linked list of potential prime integers is a prime integer.

11. The device of claim 9, wherein the one or more processors, when determining whether the integer is a proven prime integer, are to:
    determine that the integer is a prime integer using the primality test or the lookup operation;
    determine that a subgroup size of a subgroup associated with the integer satisfies a threshold;
    determine that an order of the subgroup associated with the integer is prime; and
    determine that a generator associated with the integer has a same order as the subgroup associated with the integer.

12. The device of claim 9, wherein the one or more processors, when determining whether each potential prime integer included in the linked list of potential prime integers is a prime integer using the primality test or the lookup operation, are to:
    determine that a quantity of primes used to generate a first potential prime integer included in the linked list of potential prime integers is zero;
    perform the lookup operation in a set of known prime integers to determine whether the first potential prime integer is included in the set of known prime integers;
    determine that the first potential prime integer is a prime integer based on performing the lookup operation;
    add the first potential prime integer to the set of proven prime integers; and
    remove the first potential prime integer from the linked list of potential prime integers.

13. The device of claim 9, wherein the one or more processors, when determining whether each potential prime integer included in the linked list of potential prime integers is a prime integer using the primality test or the lookup operation, are to:
    determine a quantity of primes used to generate a next potential prime integer included in the linked list of potential prime integers;
    remove one or more prime integers from the set of proven prime integers,
        wherein a quantity of the one or more prime integers from the set of proven prime integers is the same as the quantity of primes used to generate the next potential prime integer, and
        wherein the one or more prime integers from the set of proven prime integers are most recently added prime integers to the set of proven prime integers;
    determine that the next potential prime integer satisfies the primality test using the one or more prime integers removed from the set of proven prime integers;
    add the next potential prime integer to the set of proven prime integers; and
    remove the next potential prime integer from the linked list of potential prime integers.

14. The device of claim 9, wherein the one or more processors, when determining whether the integer is a proven prime integer, are to:
    determine the status associated with the integer, wherein the status indicates the proving process associated with determining whether the integer is a proven prime integer is:
        successful, based on a determination that there are no potential prime integers remaining in the linked list of potential prime integers and that only the integer is included in the set of proven prime integers, not successful, based on a determination that a potential prime integer included in the linked list of potential prime integers is not prime using the primality test or the lookup operation, or failed, based on a determination that the device is unable to determine whether a potential prime integer included in the linked list of potential prime integers is a prime integer using the primality test or the lookup operation.

15. A non-transitory computer-readable medium storing instructions, the instructions comprising:
one or more instructions that, when executed by one or more processors, cause the one or more processors to:
receive a set of cryptographic parameters associated with an integer,
wherein the set of cryptographic parameters include a linked list of potential prime integers used to generate the integer in an order;
determine, iteratively and in the order, whether each potential prime integer included in the linked list of potential prime integers is a prime integer using a primality test or a lookup operation based on a set of proven prime integers;
determine whether the integer is a proven prime integer based on determining that each potential prime integer included in the linked list of potential prime integers is a prime integer and based on determining a status of a proving process associated with the integer; and
use, when the integer is a proven prime integer, the integer in a cryptographic protocol.

16. The non-transitory computer-readable medium of claim 15, wherein the order is based on a determination that one or more prime integers included in the linked list of potential prime integers are required to be proven to determine whether another potential prime integer included in the linked list of potential prime integers is a prime integer.

17. The non-transitory computer-readable medium of claim 15, wherein the one or more instructions, that cause the one or more processors to determine whether the integer is a proven prime integer, cause the one or more processors to:
determine that the integer is a prime integer using the primality test or the lookup operation;
determine that a subgroup size of a subgroup associated with the integer satisfies a threshold;
determine that an order of the subgroup associated with the integer is prime; and
determine that a generator associated with the integer has a same order as the subgroup associated with the integer.

18. The non-transitory computer-readable medium of claim 15, wherein the one or more instructions, that cause the one or more processors to determine whether each potential prime integer included in the linked list of potential prime integers is a prime integer using the primality test or the lookup operation, cause the one or more processors to:
determine that a quantity of primes used to generate a next potential prime integer included in the linked list of potential prime integers is zero;
perform the lookup operation in a set of known prime integers to determine whether the next potential prime integer is included in the set of known prime integers;
determine that the next potential prime integer is a prime integer based on performing the lookup operation;
add the next potential prime integer to the set of proven prime integers; and
remove the next potential prime integer from the linked list of potential prime integers.

19. The non-transitory computer-readable medium of claim 15, wherein the one or more instructions, that cause the one or more processors to determine whether each potential prime integer included in the linked list of potential prime integers is a prime integer using the primality test or the lookup operation, cause the one or more processors to:
determine a quantity of child primes associated with a next potential prime integer included in the linked list of potential prime integers;
remove one or more prime integers from the set of proven prime integers,
wherein a quantity of the one or more prime integers from the set of proven prime integers is the same as the quantity of child primes associated with the next potential prime integer;
determine that the next potential prime integer satisfies the primality test using the one or more prime integers from the set of proven prime integers;
add the next potential prime integer to the set of proven prime integers; and
remove the next potential prime integer from the linked list of potential prime integers.

20. The non-transitory computer-readable medium of claim 15, wherein the one or more instructions, that cause the one or more processors to determine whether the integer is a proven prime integer, cause the one or more processors to:
determine the status associated with the integer, wherein the status indicates the proving process associated with determining whether the integer is a proven prime integer is:
successful, based on a determination that there are no potential prime integers remaining in the linked list of potential prime integers and that only the integer is included in the set of proven prime integers,
not successful, based on a determination that a potential prime integer included in the linked list of potential prime integers is not prime using the primality test or the lookup operation, or
failed, based on a determination that a prime status of one or more potential prime integers included in the linked list of potential prime integers cannot be determined.

* * * * *